J. W. MARSTON, Jr.
SHOE ATTACHMENT FOR AUTOMOBILE WHEELS.
APPLICATION FILED JULY 2, 1912.
1,083,886.
Patented Jan. 6, 1914.
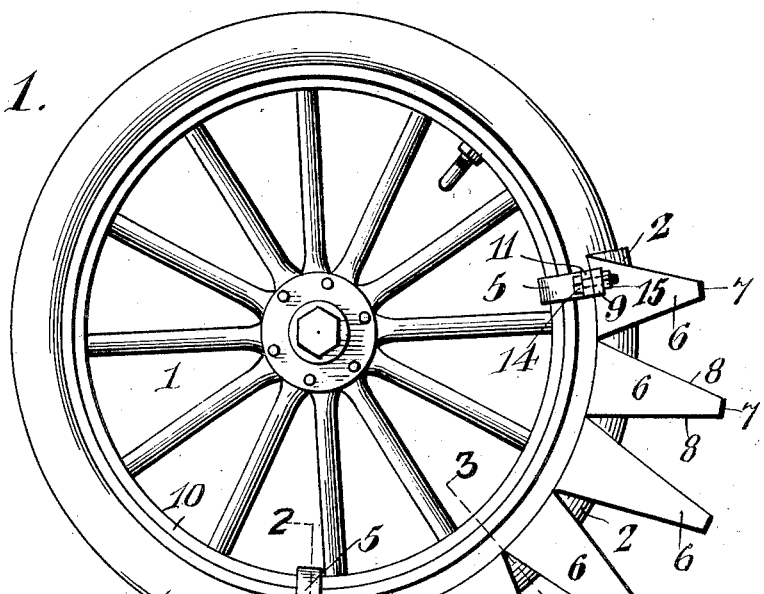
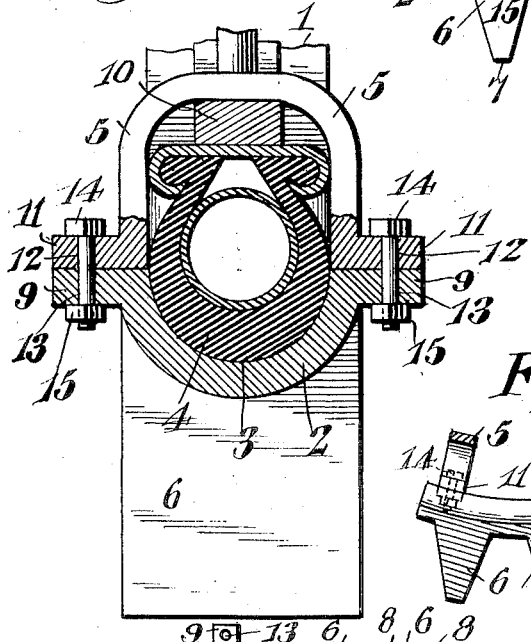
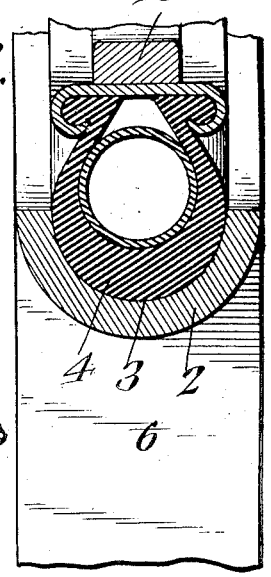
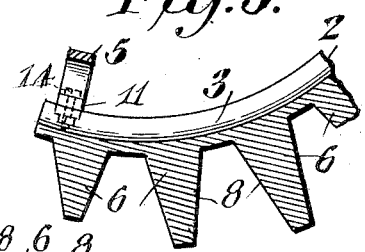
WITNESSES
Jas. K. McCathran
H. H. Riley
John W. Marston Jr. INVENTOR
BY C. G. Siggers
ATTORNEY

UNITED STATES PATENT OFFICE.

JOHN W. MARSTON, JR., OF MOBILE, ALABAMA.

SHOE ATTACHMENT FOR AUTOMOBILE-WHEELS.

1,083,886.  Specification of Letters Patent.  Patented Jan. 6, 1914.

Application filed July 2, 1912. Serial No. 707,297.

*To all whom it may concern:*

Be it known that I, JOHN W. MARSTON, Jr., a citizen of the United States, residing at Mobile, in the county of Mobile and State of Alabama, have invented a new and useful Shoe Attachment for Automobile-Wheels, of which the following is a specification.

The invention relates to a shoe attachment for automobile and motor vehicle wheels.

The object of the present invention is to provide a simple, inexpensive and efficient device of strong and durable construction, adapted to be carried in an automobile, motor vehicle, or the like, and capable when such a machine becomes stuck in the mud or sand of being readily applied to the rear or driving wheel, and when the car is put in motion of pushing the car ahead and of raising the same out of the hole.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a shoe attachment, constructed in accordance with this invention, and shown applied to an automobile wheel. Fig. 2 is a transverse sectional view on the line 2—2 of Fig. 1. Fig. 3 is a similar view on the line 3—3 of Fig. 1. Fig. 4 is a detail front view of a portion of the attachment. Fig. 5 is a detail longitudinal sectional view of one end of the shoe attachment.

Like numerals of reference designate corresponding parts in all the figures of the drawing.

In the accompanying drawing in which is illustrated the preferred embodiment of the invention, the tread attachment, which is designed to be applied to a pneumatically tired automobile wheel 1, or other motor vehicle wheel, comprises a longitudinally curved approximately semi-tubular or semi-cylindrical shell or body 2, constructed of cast iron or other suitable material and presenting an inner concave face 3 to fit the pneumatic tire 4 of the wheel 1, and it is detachably secured to the same by means of clamps 5. The shell 2 is preferably of a length to extend over one quarter of the periphery of the wheel, and it is provided at its rounded or convex outer face with projecting blades or arms 6, tapered outwardly and wedge-shaped or triangular in side elevation and having blunt outer terminals 7. The arms or blades, which extend entirely across the shell or body, have a substantially uniform width greater than the thickness of the wheel at the rim thereof and are provided with flat front and rear faces 8, and they are arranged at regular intervals being preferably contiguous to one another at the sides of the attachment. The arms or blades also preferably increase in length from the ends of the series to the center of the attachment, which may be of any desired length.

The attachment is provided at its ends with laterally projecting lugs or ears 9, and the clamps 5, which consist of approximately U-shaped yokes, extend across and fit against the felly 10 of the wheel and are provided with laterally projecting terminal portions 11, forming lugs or ears and provided with perforations 12, adapted to register with corresponding perforations 13 of the lugs or ears 9 of the attachment to receive fastening bolts 14. The bolts 14, which are equipped with nuts 15, enable the attachment to be easily and quickly applied to a wheel, and the said attachment is placed on the wheel at the front close to the ground, and when the machine is put in motion, the attachment will force the car ahead and will simultaneously lift the same from a hole should the machine be stuck in the sand or mud. The gradual increase in the length of the arms or blades from the ends to the center of the set or series enables the wheel to be gradually lifted from and carried beyond a hole or depression. Any other suitable clamping means may, of course, be employed for detachably securing the attachment to a wheel.

The attachment is adapted to be conveniently carried in an automobile, motor vehicle, motor truck, or similar machine, and it will enable the same to be quickly pulled out of a mud hole, or other bad spot.

What is claimed is:—

1. A tread attachment comprising a body curved longitudinally to fit the periphery of a wheel and provided with projecting arms or blades gradually increasing in length and adapted when the wheel is rotated to push the same ahead and simultaneously lift the wheel.

2. A tread attachment comprising a body curved longitudinally to fit the periphery of a wheel and provided with a series of projecting arms or blades increasing in length from the ends of the body, and means for securing the body to a wheel.

3. A tread attachment comprising a longitudinally curved approximately semi-tubular shell adapted to fit a tire and provided at its outer face with a series of integral outwardly tapered projecting arms or blades extending entirely across the shell and having contiguous portions at the side edges thereof.

4. A tread attachment comprising a body curved longitudinally to fit a wheel and provided with a set or series of outwardly projecting arms or blades tapered outwardly and increasing in length from the ends of the series.

5. A tread attachment including a curved series of projecting arms or blades, said series being of a length to extend over approximately one quarter of the periphery of the wheel, and means for mounting the arms or blades on a wheel, said arms or blades having a substantially uniform width greater than the thickness of the wheel at the rim thereof and adapted to extend entirely across the tread of a wheel.

6. A tread attachment for wheels including a curved series of projecting arms or blades gradually increasing in length and adapted when a wheel is rotated to push the same ahead and simultaneously lift the wheel, and means for mounting the arms or blades on a wheel.

7. A tread attachment for wheels including a curved series of projecting arms or blades increasing in length from the ends of the series toward the center of the same, and means for mounting the arms or blades on a wheel.

In testimony, that I claim the foregoing as my own, I have hereto affixed my signature in the presence of two witnesses.

JOHN W. MARSTON, Jr.

Witnesses:
H. C. LOGAN,
T. L. HALLETT.